(No Model.)
W. G. BOND.
ATOMIZER FOR BAKERS' OVENS.
No. 462,964. Patented Nov. 10, 1891.
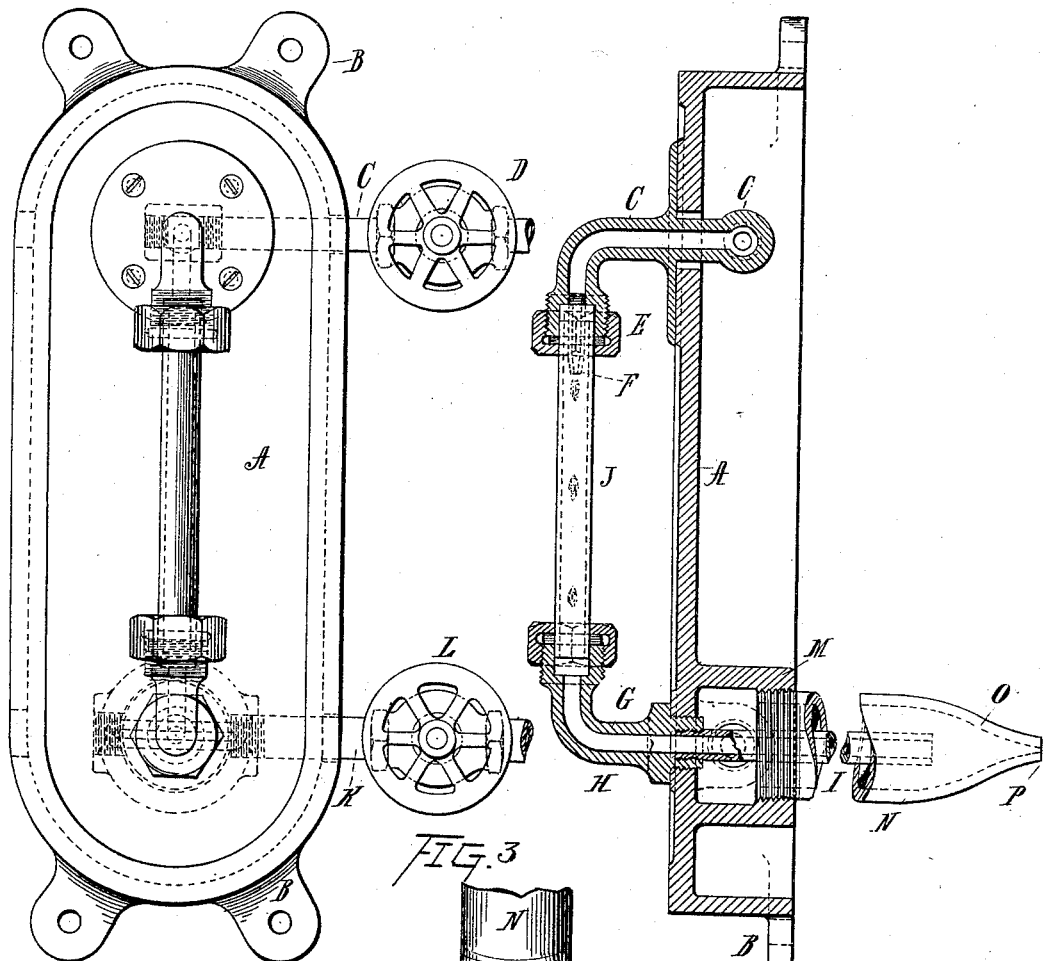
WITNESSES:
Edward C. Rowland
F. Nelson Scott
INVENTOR
W. G. Bond
BY
A. M. Pierce
ATTORNEY

UNITED STATES PATENT OFFICE.

WILLIAM G. BOND, OF NEW YORK, N. Y.

ATOMIZER FOR BAKERS' OVENS.

SPECIFICATION forming part of Letters Patent No. 462,964, dated November 10, 1891.

Application filed April 22, 1891. Serial No. 389,914. (No model.)

*To all whom it may concern:*

Be it known that I, WILLIAM G. BOND, a citizen of the United States, and a resident of the city, county, and State of New York, have invented new and useful Improvements in Atomizers for Bakers' Ovens, of which the following is a specification.

My invention relates, especially, to means and mechanism employed for moistening or cleaning the surface of biscuits or similar goods in the oven, and has for its object the provision of an atomizer whereby the requisite moisture may be applied, removing or incorporating all superfluous flour with the biscuit, leaving the article clean and smooth when baked.

To attain the desired end my invention consists, essentially, in a combined steam and water atomizer embodying certain novel and useful combinations or arrangements of parts and peculiarities of construction and operation, all of which will be hereinafter first fully described, and then pointed out in the claim.

In the drawings, Figure 1 is a front elevation of my improved atomizer. Fig. 2 is a side view and partial section thereof. Fig. 3 is a plan view of the extremity of the atomizing device within the oven. Fig. 4 is a view of the mouth of the atomizer.

Like letters of reference wherever they occur indicate corresponding parts in all the figures.

A is the main frame, arranged to be secured to the wall of an oven by means of ears B.

C is a water-supply pipe, provided with a regulating-valve D. Pipe C passes to a connection E and terminates at an outlet-tube F.

G is a second connection, engaging with an elbow H, supported by the main frame and engaging with a pipe I, extending inward.

J is a glass connecting the pipes or elbows C and H, as plainly shown.

K is a steam-supply pipe, provided with a regulating-valve L. This pipe is connected to a chamber M, formed upon or secured to the main frame, and through which water-pipe I extends. Connected to the chamber M is a steam-pipe N, having its extremity flattened at O, thus providing a wide thin flaring opening P, particularly illustrated in Fig. 4.

When constructed and arranged in accordance with the foregoing description and the parts assembled for use in connection with an oven, the operation of my device is as follows: Water is permitted to escape from tube F and drop within the glass J. By this arrangement the operator can see the exact amount of water which drops within the glass and regulate the quantity to a nicety, in accordance with the requirements of the class of goods being treated. The water flows into the tube I, and as said tube is surrounded by steam the water becomes highly heated by the time it escapes from the tube at the inner extremity thereof, and it is at once broken up and mingles with the steam in such a manner that the combined water and steam escape from the wide thin mouth of the pipe O at P in a fine spray, which is spread out in a horizontal fan shape, passing over each successively-moving shelf of the oven, settling upon the goods, which are cooler than the atmosphere within the oven and the walls thereof. The water or spray is at once absorbed by the flour upon the goods, said flour becoming a part of the dough, and when the goods are taken from the oven their surface is beautifully clean and smooth.

By the peculiar construction and arrangement of my atomizer I am enabled to use a very small quantity of steam and thoroughly utilize what is used, as the mingled steam and water is applied directly to the goods being treated, and there is no condensation upon the top and walls of the oven, and consequent waste of steam and injury of the goods, as has heretofore been the case.

Having now fully described my invention, what I claim as new therein, and desire to secure by Letters Patent, is—

In a device of the character herein specified, a water-supply connected to a glass tube into which the water passes at the top, as set forth, a connection with said glass at the bottom extending into a chamber and extension thereof, said tube terminating in a horizontal narrow flaring opening, and a steam-supply pipe connected to the chamber and extension thereof, the whole combined and arranged to operate substantially as shown and described.

WILLIAM G. BOND.

Witnesses:
A. M. PIERCE,
T. NELSON SCOTT.